United States Patent
Choudhury et al.

(10) Patent No.: US 7,483,440 B2
(45) Date of Patent: Jan. 27, 2009

(54) RING LSP TOPOLOGY FOR SUPPORTING VPNS OVER MPLS-BASED NETWORKS

(75) Inventors: Sanjaya Choudhury, Allison Park, PA (US); Rahmi Marasli, Mars, PA (US)

(73) Assignee: Ericsson AB, Stockholm (SE)

( * ) Notice: Subject to any disclaimer, the term of this patent is extended or adjusted under 35 U.S.C. 154(b) by 532 days.

(21) Appl. No.: 11/264,106

(22) Filed: Nov. 1, 2005

(65) Prior Publication Data

US 2007/0115985 A1    May 24, 2007

(51) Int. Cl.
*H04L 12/28*    (2006.01)
*H04L 12/56*    (2006.01)
(52) U.S. Cl. .................... 370/409; 370/258; 370/400
(58) Field of Classification Search .................. None
See application file for complete search history.

(56) References Cited

U.S. PATENT DOCUMENTS 5,612,959 A    3/1997    Takase et al.
7,173,913 B2 *    2/2007    Sato ........................... 370/256
7,366,109 B2 *    4/2008    Ashwood-Smith .......... 370/254
2003/0043792 A1 *    3/2003    Carpini et al. .............. 370/386
2006/0193257 A1 *    8/2006    Behzadi ....................... 370/230

FOREIGN PATENT DOCUMENTS

WO    WO 2005/060156 A    6/2005

* cited by examiner

*Primary Examiner*—Wing F Chan
*Assistant Examiner*—Robert C Scheibel
(74) *Attorney, Agent, or Firm*—Ansel M. Schwartz

(57) ABSTRACT

A communications system for transmitting packets includes a network. The system includes a plurality of P, PE and CE devices in communication with the network. The system includes a controller which creates an LSP through the PE devices defining a path such that the LSP starts and ends at the same PE node. A method for transmitting packets. The method includes the steps of creating an LSP through PE devices in communication with the network defining a path such that the LSP starts and ends at the same PE node. There is the step of sending the packets along the path.

8 Claims, 1 Drawing Sheet

VPN REFERENCE MODEL

RING LSP TOPOLOGY

RING LSP TOPOLOGY LABEL STACK

RING LSP TOPOLOGY FOR SUPPORTING VPNS OVER MPLS-BASED NETWORKS

FIELD OF THE INVENTION

The present invention relates to a communications system which supports VPNs over MPLS-based networks. More specifically, the present invention relates to a communications system having a ring LSP topology which supports VPNs over MPLS-based networks.

BACKGROUND OF THE INVENTION

As many trade journals indicate, MPLS-based VPN service is a lucrative business for the Service Providers and is rapidly growing. To provision VPN for a customer with many sites connected to service provider PE devices, one needs a network topology where each PE device is connected to other via tunnel LSPs. This can be done via different techniques. One widely used technique is a mesh-topology. This topology creates several problems for the providers; some of these are enumerated below:
  (i) Connecting each PE by a tunnel LSP can potentially lead to a large number of LSPs and managing them can be very difficult for service providers.
  (ii) Detecting data-plane lively-ness of the tunnel LSPs connecting the PEs using the MPLS-OAM techniques can cause sever scalability issues. Since MPLS-OAM places additional processing burdens on the Ingress and Egress LSRs, the number of tunnel LSPs and PEs involved in traditional VPN solutions, makes this fault detection technique difficult to deploy.
  (iii) Deploying the recovery techniques using backup/alternative LSPs, in this environment is relatively inefficient and difficult to manage.
  (iv) Supporting multicast and broadcast traffic (specifically while offering VPLS services) can be difficult to deploy.

As an alternative to mesh topology, Star topology can be used. This reduces the number of tunnels needed, but does not address the issues related to MPLS-OAM, resiliency and multicast/broadcast traffic.

Virtual Private Networks (VPNs) have been widely deployed over MPLS-based networks as a new revenue generating service. RFC3031: Multiprotocol Label Switching Architecture, IETF Standards Track RFC, January 2001; RFC3021: *MPLS Label Stack Encoding*, IETF Standards Track RFC, January 2001, both of which are incorporated by reference herein. In a typical VPN scenario, customer sites at different locations are connected via a service provider network. Even though the service provider network is serving many different customers, each customer's traffic is treated separately from each other and given a virtual privacy. VPN services offered over MPLS networks can be grouped into PWE3, L2VPN and L3VPN categories.

In PWE3 VPN services, MPLS network is used just as a transport medium to tunnel customer traffic from one site to another one in its native format. PWE3 services have been defined for various traffic formats such as ATM, Ethernet, PPP, TDM, etc. For more information on PWE3 architecture and various PWE3 services, see IETF PWE3 Working Group, RFC3916: Requirements for Pseudo-Wire Emulation Edge-to-Edge (PWE3), IETF Informational RFC, September 2004; RFC3985: Pseudo Wire Emulation Edge-to-Edge (PWE3) Architecture, IETF Informational RFC, March 2005; Luca Martini, et al. "*Encapsulation Methods for Transport of Ethernet Over MPLS Networks*", Internet Draft, draft-ietf-pwe3-ethernet-encap-09.txt, February 2005; Luca Martini, et al., "*Encapsulation Methods for Transport of Frame Relay Over MPLS Networks*", draft-ietf-pwe3-frame-relay-04.txt, February 2005; Luca Martini, et al., "*Encapsulation Methods for Transport of ATM Over MPLS Networks*", draft-ietf-pwe3-atm-encap-07.txt, October 2004; Mallis, et al., "*PWE3 ATM Transparent Cell Transport Service*", draft-ietf-pwe3-cell-transport-02.txt, February 2005; Vainshtein, et al., "*Structure-Agnostic TDM over Packet (SAToP)*", draft-ietf-pwe3-satop-01.txt, December 2003; Andrew G. Malis, et al. "*SONET/SDH Circuit Emulation over Packet (CEP)*", Internet Draft, draft-ietf-pwe3-sonet-10.txt, February 2005, all of which are incorporated by reference herein.

In the case of L2VPNs, a provider-provisioned layer2 VPN service is provided. An interesting L2VPN service is what is called a *Virtual Private LAN Service* (VPLS). VPLS emulates LAN across an MPLS-enabled IP network, allowing standard Ethernet devices communicate with each other as if they were connected to a common LAN segment. In VPLS, MPLS network acts as if it were part of the customer LAN. IETF L2VPN Working Group, K. Kompella, et al., "*Virtual Private LAN Service*" draft-ietf-12vpn-vpls-bgp-04, February 2005; Marc Laserre, Vach Kompella, "*Virtual Private LAN Services over MPLS*", draft-ietf-12vpn-vpls-ldp-06.txt, February 2005, all of which are incorporated by reference herein.

L3VPNs are defined for supporting provider-provisioned layer3 (routed) VPNS. In L3VPNs, MPLS network helps and participates customer's IP routing functionality. IETF L3VPN Working Group, E. Rosen, Y. Rekhter, "*BGP/MPLS IP VPNS*", Internet Draft, draft-ietf-13vpn-rfc2547bis-03.txt, October 2004, both of which are incorporated by reference herein.

FIG. 1 illustrates common VPN architecture reference model used at all MPLS VPN services. In general, customer edge (CE) devices are connected to provider edge (PE) devices. The provider devices that are not directly connected to CE devices are called core provider (P) devices.

In FIG. 1, CEa sends all traffic destined to CEb to PEx. Then, PEx will do the following:
  First, there has to be a label switched path (LSP) connecting PEx to PEy. This is called a tunnel LSP.
  PEx will push a label for traffic coming from CEa destined to CEb via PEy. This is called a VPN label and it helps PEy to determine this packet has to go out to CEb.
  Then, PEx pushes the tunnel label for the LSP connecting PEx to PEy.

These operations will ensure that packet arrives at PEy. Then, PEy will process this packet as follows:
  First, pop off the top tunnel label.
  Then examine the second level label. If it is the VPN label for CEb, sent packet out to CEb.

Please notice that this two level label stacking approach ensures that P devices do not have to know CE devices and their VPN labels. Only think P devices process is the tunnel LSPs connecting PE devices. As a result, this results in a scalable P device architecture.

In general, for a customer with N sites (say CE1 through CEn) connected to M PE devices (say PE1 through PEm), we need a network topology where each PE device is connected with each other via tunnel LSPs.

There are various ways of connecting PE devices via tunnel LSPs. One simple approach is to use a mesh topology where a separate and dedicated LSP is setup between any pair of PEs. For M PEs, this will result in M^2 tunnel LSPs. Another approach is to use a star topology. In this case, each PE is connected to a central core router. It is this central core routers responsibility to switch PE-to-PE traffic. This will result in a total of M LSPs for M PE devices.

SUMMARY OF THE INVENTION

The present invention pertains to a communications system for transmitting packets. The system comprises a network. The system comprises a plurality of P, PE and CE devices in communication with the network. The system comprises a controller which creates a first LSP through the PE devices defining a path such that the LSP starts and ends at the same PE node.

The present invention pertains to a method for transmitting packets. The method comprises the steps of creating a first LSP through PE devices in communication with the network defining a path such that the LSP starts and ends at the same PE node. There is the step of sending the packets along the path.

The present invention provides the VPN service providers an alternative way to provide a highly resilient VPN infrastructure that is particularly suitable for VPNs dealing with large amount of multicast/broadcast traffics, such as VPLS services.

The present invention helps VPN service providers address the limitations outlined in the previous section in an efficient manner.

The present invention presents an alternative network topology, called LSP ring topology, for providing PE device connectivity. This approach only requires a single LSP connecting all PE devices and it is better suited for MPLS OAM and multicast/broadcast services. Particularly due to its suitability to multicast/broadcast services, this topology is deemed better suited for providing VPN services with extensive multicast/broadcast needs such as VPLS.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
FIG. 1 is a block diagram of a prior art VPN reference model.
Figure 2:
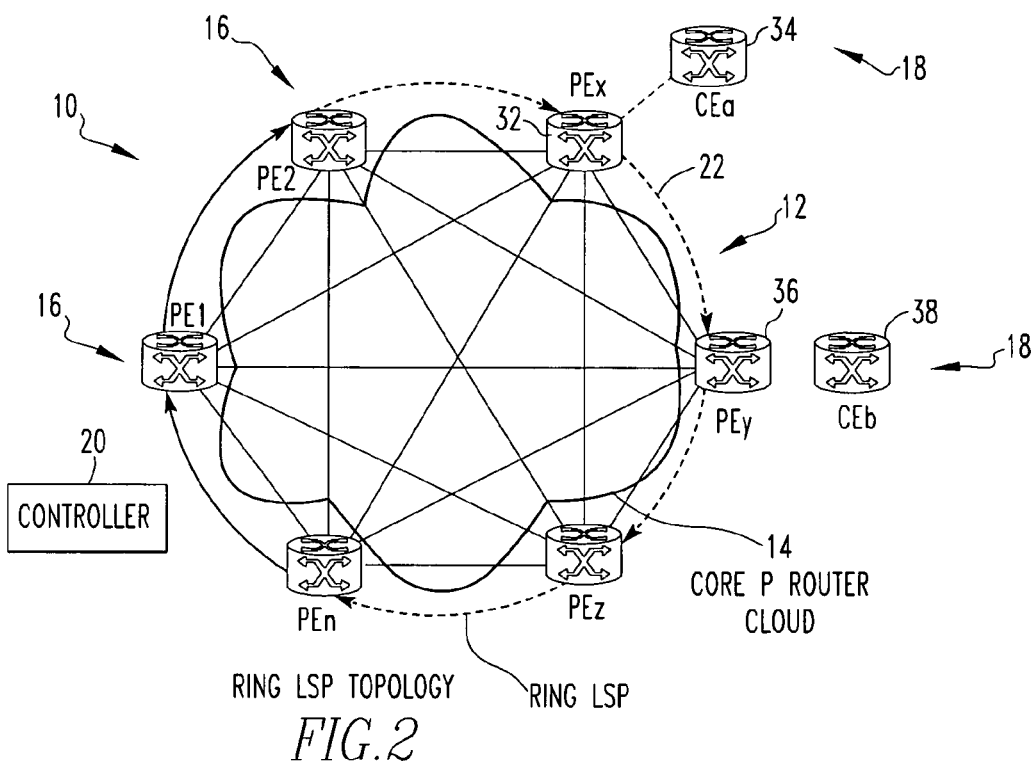
FIG. 2 is a block diagram of a ring LSP topology of the present invention.

Referring now to the drawings wherein like reference numerals refer to similar or identical parts throughout the several views, and more specifically to FIG. 2 thereof, there is shown a communications system 10 for transmitting packets. The system 10 comprises a network 12. The system 10 comprises a plurality of P devices 14, PE devices 16 and CE devices 18 in communication with the network 12. The system 10 comprises a controller 20 which creates a first LSP through the PE devices 16 defining a path 22 such that the LSP starts and ends at the same PE node.

Figure 3:
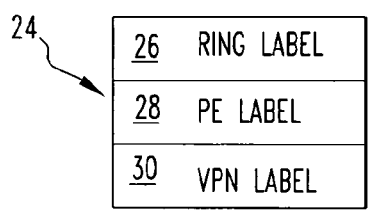
FIG. 3 is a diagram of a stack.

Preferably, the path 22 is a ring. The network 12 controller 20 preferably creates a second LSP in a reverse direction to a direction of the first LSP. Preferably, each packet has a label stack 24 depth of three, as shown in FIG. 3. The label stack 24 preferably has a ring label 26 identifying the ring, a PE label 28 identifying each PE within the ring, and a VPN label 30 identifying a CE device 18 connected to one of the PE devices 16.

Preferably, there is a first PE device 32, a first CE device 34 sending a packet in communication with the first PE device 32, a second PE device 36 in communication with the first PE device 32, and a second CE device 38 to receive the packet in communication with the second PE device 36, and wherein the first PE device 32 first determines that the packet destination is the second CE device 38 in communication with the second PE device 36, pushes the VPN label 30 for the second CE device 38 to the packet and also pushes the PE label 28 for the second PE device 36, and the ring LSP label is pushed to the packet, and then transmits the packet to the network 12. Each PE device 16 which receives the packet preferably examines the PE label 28 to determine if the packet is destined to it.

Preferably, the second PE device 36 confirms that the packet destination is the second PE device 36 by checking the PE label 28, pops off both the ring label 26 and the PE label 28, examines the VPN label 30 and matches it against the second CE label, removes the VPN label 30 and sends the packet to the a second CE device 38. The network 12 preferably supports a multicast/broadcast packet, the PE label 28 identifies a multicast/broadcast Group, the VPN label 30 is used as a group identifier to indicate which CE devices 18 are to receive the multicast/broadcast packet, the PE device 16 originating a multicast/broadcast packet which first pushes the VPN label 30 and then the PE device group label 28; and then pushes the ring label 26 on the label stack 24.

The present invention pertains to a method for transmitting packets. The method comprises the steps of creating a first LSP through PE devices 16 in communication with the network 12 defining a path 22 such that the LSP starts and ends at the same PE node. There is the step of sending the packets along the path 22.

Preferably, the path 22 is a ring. There is preferably the step of creating a second LSP in a reverse direction to a direction of the first LSP. Preferably, there is the step of forming a label stack 24 depth of three in each packet. The label stack 24 preferably has a ring label 26 identifying the ring, a PE label 28 identifying each PE within the ring, and a VPN label 30 identifying a CE device 18 connected to one of the PE devices 16.

Preferably, there is a first PE device 32, a first CE device 34 sending a packet in communication with the first PE device 32, a second PE device 36 in communication with the first PE device 32, and a second CE device 38 to receive the packet in communication with the second PE device 36, and including the steps of determining with the first PE device 32 that the packet destination is the second CE device 38 in communication with the second PE device 36, pushing the VPN label 30 for the second CE device 38 to the packet and also pushing the PE label 28 for the second PE device 36, pushing the ring LSP label to the packet, and transmitting the packet to the network 12. There is preferably the step of examining by each PE device 16 which receives the packet the PE label 28 to determine if the packet is destined to it.

Preferably, there are the steps of confirming with the second PE device 36 that the packet destination is the second PE device 36 by checking the PE label 28, popping off both the ring label 26 and the PE label 28, examining the VPN label 30 and matching it against the second CE label, removing the VPN label 30 and sending the packet to the second CE device 38. The network 12 preferably supports a multicast/broadcast packet, the PE label 28 identifies a multicast/broadcast Group, the VPN label 30 is used as a group identifier to indicate which CE devices 18 are to receive the multicast/broadcast packet, and including the steps of the originating from the PE device 16 a multicast/broadcast packet which first pushes the VPN label 30 and then the PE device group label 28; and then pushing the ring label 26 on the label stack 24.

In the operation of the invention, a ring LSP connects all PE devices 16, as shown in FIG. 2.

In this topology, an optional second LSP in the reverse direction can also be used for resiliency or efficiency purposes.

As opposed to traditional MPLS VPNs where a two level label stack 24 is used, the proposed approach requires a label stack 24 depth of 3 (see FIG. 3). The top label is for the tunnel LSP identifying the ring. The second label is a unique label identifying each PE within the ring. Finally, VPN label 30 identifies the CE device 18 connected to one of the PE devices 16. To avoid a packet indefinitely looping at ring LSP, the TTL value will be set to either "ring LSP length—1" or the distance from originating PE to terminating PE. Penultimate Hop Popping (PHP) will not be supported in this topology.

For CEa connected to PEx and wishing to send a packet to CEb connected to PEy (please refer to FIG. 2), the following operations will happen at PEx:

PEx will first determine that packet destination is CEb connected off of PEy.

A VPN label 30 for CEy will be pushed to the packet.

PEx will also push a PE label 28 for PEy.

Then, the ring LSP label will be pushed and the packet will be transmitted after stamping appropriate TTL value.

When packet is flowing from PEx to PEy, each PE node in between will examine the PE label 28 to determine if this packet is destined to them. At PEy, the following processing will happen:

It will be confirmed that packet destination is PEy by checking PE label 28.

Both Ring tunnel and PE labels 28 will be popped off.

VPN label 30 will be examined and it will be matched against CEy's label.

The VPN label 30 will be removed and the packet will be sent to CEy.

For supporting multicast/broadcast traffic, a slightly different approach will be taken. Firstly, PE label 28 will be used to identify a multicast/broadcast group, not just a PE device 16. The VPN label 30 will also be used as a group identifier to indicate CE devices 18 that would receive this multicast/broadcast packet.

The PE originating the multicast/broadcast traffic will first determine which CE device 18 multicast group label. Then, the corresponding PE device group label 28 will be determined. These two labels along with the top ring LSP label will be added to packet.

As PE devices 16 examining the packets' PE labels 28, the packets with a PE group label that the PE device 16 is member of will be trapped. These packets will be then multicast/broadcast to corresponding CE devices 18 by the PE device 16. Please notice that a copy of the multicast packets will be sent to the downstream PE devices 16. The TTL value of the multicast/broadcast traffic will be set to either "ring LSP path length—1" or to the maximum path length between originating PE and destination PEs.

With ring LSP topology, it would be easier to support OAM functionality as well. In general, supporting OAM is challenging with merging and multicasting LSPs. Y.1710: *Requirements for OAM functionality for MPLS Networks*, ITU-T Recommendation; Y.1711: *OAM mechanism for MPLS Networks*, ITU-T Recommendation, both of which are incorporated by reference herein. In the approach, there is no need to create LSP merging or multicasting. Another challenge with OAM is scalability since it incurs large processing overhead per LSP. The approach results in only one LSP regardless of number of PEs. This is as compared to mesh or start topologies where you would need M^2 or M LSPs for PEs. Hence, overall, a ring LSP topology is creates a friendlier environment for supporting MPLS OAM feature.

It is also important to notice that Ring LSP topology is better suited for resiliency features as well. Since this topology is similar to the one used in traditional transport networks, their resiliency techniques (e.g., dual ring resiliency) can easily be adapted for MPLS layer as well. It is also important to notice that by setting up a second ring LSP that is path disjoint with respect to P nodes, both the LSP redundancy feature and fast reroute/local bypass mechanisms are taken advantage of.

The construction of a "shortest" Ring LSP is a NP Complete problem. Specifically, one can show that the Traveling Salesman Problem (TSP) is a particular instance of this problem. Lots of research has been done to determine approximation algorithms for TSP. One of these algorithms can be used as a basis for computing the path 22 for the Ring LSP. *Gerhard Reinelt, "The Traveling Salesman. Computational Solutions for TSP Applications, volume* 840 *of Lecture Notes in Computer Science". Springer-Verlag, BerlinHeidelberg New York,* 1994, incorporated by reference herein.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A communications system for transmitting packets comprising:

a network;

a plurality of core provider (P) devices, provider edge (PE) devices and customer edge (CE) devices in communication with the network, including a first PE device, a first CE device sending a packet in communication with the first PE device, a second PE device in communication with the first PE device, and a second CE device to receive the packet in communication with the second PE device; and a controller which creates a first label switched path (LSP) through the PE devices defining a ring path such that the LSP starts and ends at the same PE node, a second LSP in a reverse direction to a direction of the first LSP, each packet has a label stack depth of three, the label stack has a ring label identifying the ring, a PE label identifying each PE within the ring, and a virtual private network (VPN) label identifying a CE device connected to one of the PE devices, wherein the first PE device first determines that the packet destination is the second CE device in communication with the second PE device, pushes the VPN label for the second CE device to the packet and also pushes the PE label for the second PE device, and the ring LSP label is pushed to the packet, and then transmits the packet to the network.

2. A system as described in Claim 1 wherein each PE device which receives the packet examines the PE label to determine if the packet is destined to it.

3. A system as described in claim 2 wherein the second PE device confirms that the packet destination is the second PE device by checking the PE label, pops off both the ring label and the PE label, examines the VPN label and matches it against the second CE label, removes the VPN label and sends the packet to the a second CE device.

4. A system as described in claim 3 wherein the network supports a multicast/broadcast packet, the PE label identifies a multicast/broadcast Group, the VPN label is used as a group identifier to indicate which CE devices are to receive the multicast/broadcast packet, the PE device originating a multicast/broadcast packet which first pushes the VPN label and then the PE device group label; and then pushes the ring label on the label stack.

5. A method for transmitting packets comprising the steps of:

creating a first label switched path (LSP) through provider edge (PE) devices in communication with the network defining a ring path such that the LSP starts and ends at the same PE node, including a first PE device, a first customer edge (CE) device sending a packet in communication with the first PE device, a second PE device in communication with the first PE device, and a second CE device to receive the packet in communication with the second PE device;

creating a second LSP in a reverse direction to a direction of the first LSP;

forming a label stack depth of three in each packet, the label stack has a ring label identifying the ring, a PE label identifying each PE within the ring, and a virtual private network (VPN) label identifying a CE device connected to one of the PE devices; and determining with the first PE device that the packet destination is the second CE device in communication with the second PE device, pushing the VPN label for the second CE device to the packet and also pushing the PE label for the second PE device, pushing the ring LSP label to the packet, and transmitting the packet to the network.

6. A method as described in claim 5 including the step of examining by each PE device which receives the packet the PE label to determine if the packet is destined to it.

7. A method as described in claim 6 including the steps of confirming with the second PE device that the packet destination is the second PE device by checking the PE label, popping off both the ring label and the PE label, examining the VPN label and matching it against the second CE label, removing the VPN label and sending the packet to the second CE device.

8. A method as described in claim 7 wherein the network supports a multicast/broadcast packet, the PE label identifies a multicast/broadcast group, the VPN label is used as a group identifier to indicate which CE devices are to receive the multicast/broadcast packet, and including the steps of the originating from the PE device a multicast/broadcast packet which first pushes the VPN label and then the PE device group label; and then pushing the ring label on the label stack.

* * * * *

UNITED STATES PATENT AND TRADEMARK OFFICE
CERTIFICATE OF CORRECTION

| | | |
|---|---|---|
| PATENT NO. | : 7,483,440 B2 | Page 1 of 1 |
| APPLICATION NO. | : 11/264106 | |
| DATED | : January 27, 2009 | |
| INVENTOR(S) | : Choudhury et al. | |

It is certified that error appears in the above-identified patent and that said Letters Patent is hereby corrected as shown below:

In Column 1, Line 30, delete "LSRs," and insert -- LSPs, --, therefor.

Signed and Sealed this

Second Day of June, 2009

JOHN DOLL
*Acting Director of the United States Patent and Trademark Office*